(12) United States Patent
Chang et al.

(10) Patent No.: US 7,719,826 B1
(45) Date of Patent: May 18, 2010

(54) INTEGRATED ACCESS COVER (75) Inventors: Ray Ling Chang, San Jose, CA (US); Dennis Yarak, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 428 days.

(21) Appl. No.: 11/174,249

(22) Filed: Jul. 1, 2005

(51) Int. Cl.
*H05K 5/00* (2006.01)
*H05K 7/00* (2006.01)
*G06F 1/16* (2006.01)
*G06F 3/02* (2006.01)
*A47B 81/00* (2006.01)

(52) U.S. Cl. .......................... 361/679.17; 361/679.27; 361/679.58; 361/679.18; 345/168; 312/223.2

(58) Field of Classification Search .................. 361/683, 361/679.17, 679.18, 679.27, 679.58; 312/223.2; 345/165
See application file for complete search history.

(56) References Cited

U.S. PATENT DOCUMENTS

| 5,083,290 | A | * | 1/1992 | Hosoi ..................... 361/679.27 |
| 5,209,448 | A | * | 5/1993 | Hatanaka et al. ............. 248/455 |
| 5,267,127 | A | * | 11/1993 | Pollitt ................... 361/679.15 |
| 5,400,213 | A | * | 3/1995 | Honda et al. ............. 361/679.08 |
| 5,443,320 | A | * | 8/1995 | Agata et al. ................. 400/715 |
| 5,448,446 | A | * | 9/1995 | Honda et al. ................. 361/680 |
| 5,507,072 | A | * | 4/1996 | Youn ............................ 16/261 |
| 5,576,929 | A | * | 11/1996 | Uchiyama et al. ........... 361/680 |
| 5,646,817 | A | * | 7/1997 | Manser et al. .......... 361/679.14 |
| 5,646,820 | A | * | 7/1997 | Honda et al. .............. 361/679.6 |
| 5,708,562 | A | * | 1/1998 | Agata et al. ................. 361/683 |
| 5,742,475 | A | * | 4/1998 | Riddiford .............. 361/679.09 |
| 5,774,329 | A | * | 6/1998 | Kuo ....................... 361/679.17 |
| 5,790,053 | A | * | 8/1998 | Chang ......................... 341/22 |
| 5,818,360 | A | * | 10/1998 | Chu et al. ..................... 341/22 |
| 5,966,284 | A | * | 10/1999 | Youn et al. ............. 361/679.17 |
| 5,982,612 | A | * | 11/1999 | Roylance .................... 361/680 |
| 6,008,986 | A | * | 12/1999 | Mok .......................... 361/687 |
| 6,028,768 | A | * | 2/2000 | Cipolla .................. 361/679.12 |
| 6,078,495 | A | * | 6/2000 | Cipolla et al. ............... 361/680 |
| 6,144,554 | A | * | 11/2000 | Mok ..................... 361/679.08 |
| 6,172,868 | B1 | * | 1/2001 | Oura ....................... 361/679.2 |
| 6,191,938 | B1 | * | 2/2001 | Ohgami et al. .............. 361/681 |
| 6,212,066 | B1 | * | 4/2001 | Fetterman ................... 361/680 |
| 6,320,743 | B1 | * | 11/2001 | Jin et al. ................. 361/679.08 |
| 6,595,786 | B2 | * | 7/2003 | Horiuchi et al. ............... 439/74 |
| 6,808,328 | B1 | * | 10/2004 | Gully ........................ 400/715 |
| 6,862,171 | B1 | * | 3/2005 | Maskatia et al. ............ 361/683 |

(Continued)

*Primary Examiner*—Jayprakash N Gandhi
*Assistant Examiner*—Bradley H Thomas
(74) *Attorney, Agent, or Firm*—Beyer Law Group LLP (57) ABSTRACT

Integrated access cover arrangements for use in a portable computing devices, where the portable computing devices include a processor and are configured to house a user accessible component are presented including: a base configured to be coupled to the portable computing device; an integrated access cover housing a keyboard, the integrated access cover being slidingly connected with the base and configured to be disposed in at least a closed position and an open position with respect to the base, the user accessible component being hidden from a user when the integrated access cover is disposed in the closed position, the user accessible component being accessible by the user when the integrated access cover is disposed in the open position. In some embodiments, arrangements further include: a drive mechanism for translating the integrated access cover. Advantages include the ability to utilize lower profile configurations while maintaining functionality.

19 Claims, 6 Drawing Sheets

U.S. PATENT DOCUMENTS

| | | | |
|---|---|---|---|
| 6,977,810 B2 * | 12/2005 | Song | 361/679.06 |
| 7,411,781 B2 * | 8/2008 | Yang | 361/679.27 |
| 2001/0055197 A1 * | 12/2001 | Agata et al. | 361/683 |
| 2002/0044411 A1 * | 4/2002 | Iredale | 361/683 |
| 2003/0011986 A1 * | 1/2003 | Ariga | 361/687 |
| 2003/0021082 A1 * | 1/2003 | Lu et al. | 361/683 |
| 2003/0142472 A1 * | 7/2003 | Park | 361/683 |
| 2003/0158615 A1 * | 8/2003 | Weber et al. | 700/96 |
| 2004/0012918 A1 * | 1/2004 | Chen | 361/683 |
| 2004/0027795 A1 * | 2/2004 | Lee et al. | 361/683 |
| 2004/0042159 A1 * | 3/2004 | Yang et al. | 361/680 |
| 2005/0018391 A1 * | 1/2005 | Jin | 361/680 |
| 2005/0035950 A1 * | 2/2005 | Daniels | 345/169 |
| 2005/0128676 A1 * | 6/2005 | Homer et al. | 361/300 |
| 2006/0023408 A1 * | 2/2006 | Schlesener et al. | 361/683 |
| 2006/0082518 A1 * | 4/2006 | Ram | 345/1.1 |
| 2006/0125796 A1 * | 6/2006 | Utz et al. | 345/168 |

* cited by examiner

FIG. 6

INTEGRATED ACCESS COVER

BACKGROUND OF THE INVENTION

Advances in computing hardware technology continue to enable lower dimensional profile computing devices while maintaining robust processing power typically associated with larger devices. No where are these advances more apparent than in the portable computing field. Notebook computers, once a luxury with limited capability, are now full-featured computing devices that are quickly becoming ubiquitous in both the business and home markets.

Figure 1:
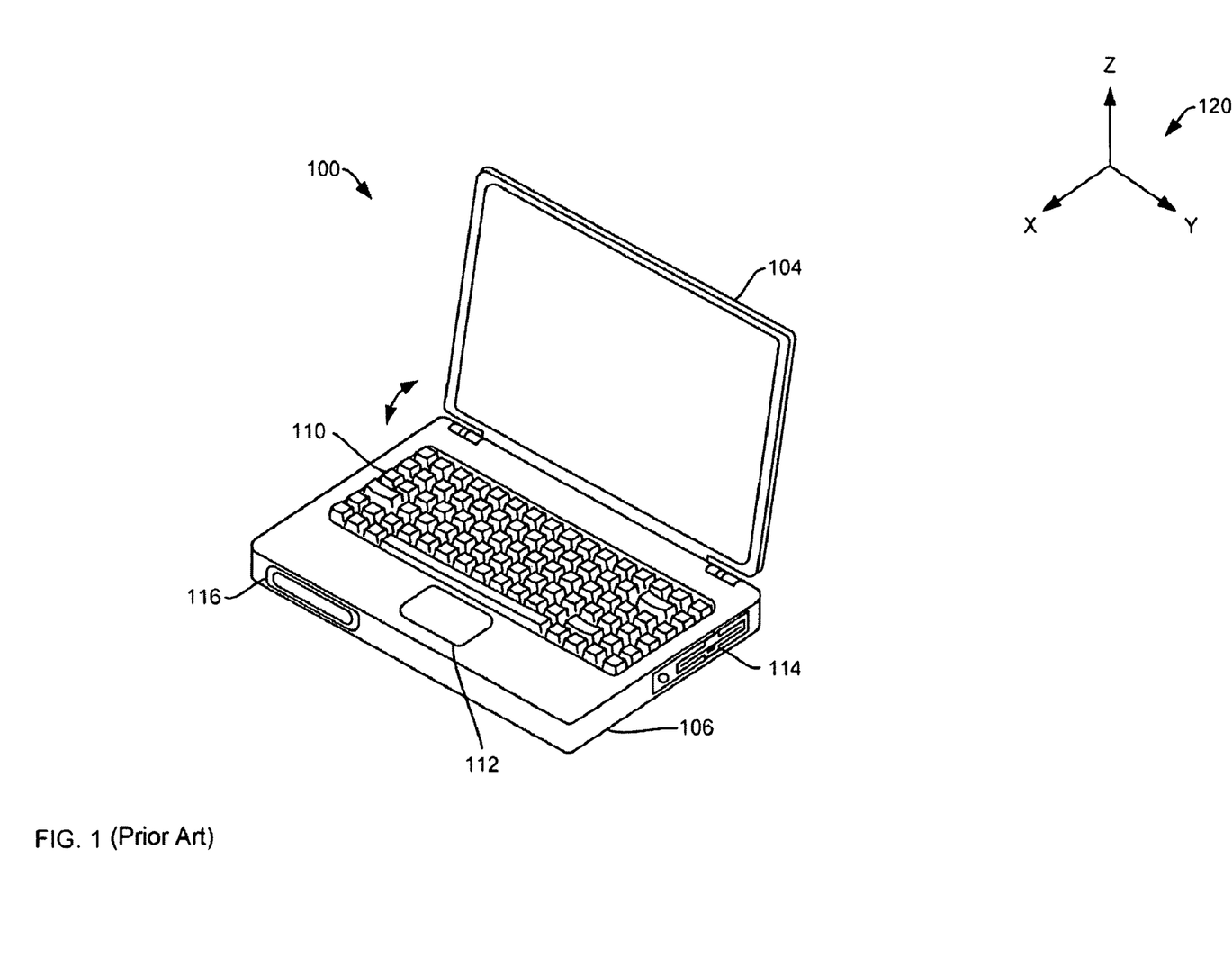
FIG. 1 is an illustrative representation of a portable computing device.

Portable computing devices may be typically configured with a base housing various computer components and a display. In one such example, FIG. 1 is an illustrative representation of a portable computing device 100. As can be appreciated, some of the illustrations provided herein are shown in orthogonal view. A viewing axes 120 is provided for clarity in interpreting the figures and should not be considered limiting. Viewing axes 120 includes three axes of orientation namely: x-axis (i.e. forward and backward); y-axis (i.e. left and right); and z-axis (i.e. up and down).

Portable computing device 100 includes a base 106 and a display 104. Base 106 may house a variety of computer components including a keyboard 110, a pointing device 112, a removable disk drive 114, and a permanent disk drive 116. Base 106 may further include a variety of access ports for interfacing with other computing components including, but not limited to, a USB port (not shown), a parallel port (not shown), a serial port (not shown), a docking station interconnect (not shown), a network port (not shown) or a monitor port (not shown). Further, display 104 may be configured in any of a number of different sizes and resolutions depending on user preference.

As can be appreciated, the number and type of devices associated with a portable computing device may, in most instances, be directly related to the dimensional constraints of the portable computing device. In some examples, size limitations may require attaching a peripheral device externally. Thus, for example, a removable media drive such as a floppy drive, a CD drive, or a DVD drive may be connected externally in configurations that cannot accommodate these devices internally. However, external peripheral devices require extra storage space and extra cabling, which may not be desirable for users relying on portability and ease of use of their portable computing devices. Arrangements that allow peripheral devices to be housed within the shrinking dimensions of a portable computing device may offer significant advantages over conventional arrangements.

Therefore, integrated access covers are presented herein.

SUMMARY OF INVENTION

Integrated access cover arrangements for use in a portable computing devices, where the portable computing devices include a processor and are configured to house a user accessible component are presented including: a base configured to be coupled to the portable computing device; an integrated access cover housing a keyboard, the integrated access cover being slidingly connected with the base and configured to be disposed in at least a closed position and an open position with respect to the base, the user accessible component being hidden from a user when the integrated access cover is disposed in the closed position, the user accessible component being accessible by the user when the integrated access cover is disposed in the open position. In some embodiments, arrangements further include: a drive mechanism for translating the integrated access cover. In some embodiments, the user accessible component may include: a removable media drive, a hard drive, a memory card, a memory port, a graphics card, a processor, and a network card.

In other embodiments, a portable computing device having a processor and configured to house a data storage component is presented including; a keyboard; an integrated access cover for housing the keyboard, the integrated access cover being slidingly connected to the portable computing device and configured to be disposed in at least a closed position and an open position with respect to the portable computing device, the data storage component being hidden from user manual access when the integrated access cover is disposed in the closed position, the data storage component being available for the user manual access when the integrated access cover is disposed in the open position. In some embodiments, the portable computing device further includes: a drive mechanism for translating the integrated access cover. In some embodiments, the data storage component may include: a removable media drive, a hard drive, a memory card, a memory port, a graphics card, a processor, and a network card.

In other embodiments, laptop computers having a processor and data storage drive are presented including: a key board; an integrated access cover for housing the keyboard, the integrated access cover being slidingly connected to the laptop computer and configured to be disposed in at least a closed position and an open position with respect to the laptop computer, the keyboard being configured to be in electronic communication with the processor at least when said integrated access cover is disposed in the closed position, the data storage drive being hidden from user manual access when the integrated access cover is disposed in the closed position, the data storage drive being available for the user manual access when the integrated access cover is disposed in the open position. In some embodiments laptop computers further include: a drive mechanism for translating the integrated access cover. In some embodiments, the data storage component may include: a removable media drive, a hard drive, a memory card, a memory port, a graphics card, a processor, and a network card.

Advantages include the ability to utilize lower profile configurations while maintaining functionality.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention may cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 2:
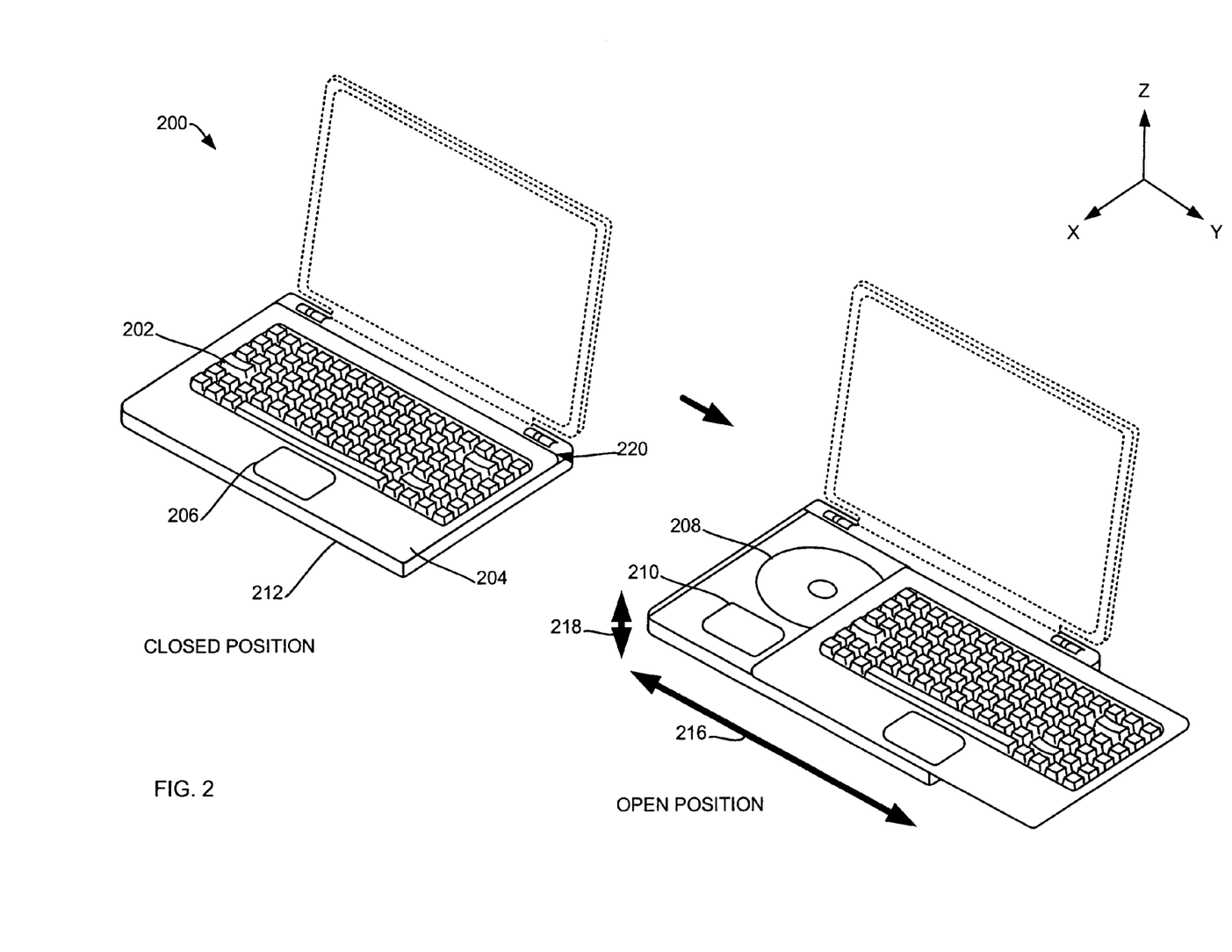
FIG. 2 is an illustrative representation of an embodiment of the present invention.

FIG. 2 is an illustrative representation of an embodiment of the present invention. In particular, a portable computing device 200 is illustrated having an integrated access cover 204 and a base 212. When integrated access cover 204 is in a closed position, portable computing device may be utilized normally. Thus keyboard 202 and track pad 206 may be utilized as integrated I/O devices. As can be appreciated, any number of integrated I/O devices may be utilized without departing from the present invention. For example, a track ball, a click-selection button, volume controls, or any number of other devices may be utilized in accordance with user configuration preferences. As can be appreciated, a flexible flat cable (not shown) may be utilized to electronically connect integrated I/O devices with a processor. Further, in some embodiments, a transition line 220 delineating integrated access cover 204 from base 212 may be present.

When integrated access cover 204 is translated to an open position, a removable media drive 208 may be exposed for user access. In some embodiments, user manual access may be achieved. That is, a user may manually access media drive 208 by manually translating integrated access cover 204. In other embodiments, a user may electronically access removable media drive 208. That is, a user may electronically access removable media drive 208 by invoking a command which will then electronically control the translation of integrated access cover 204 or by activating a switch which will then electronically control the translation of integrated access cover 204. As noted above, any number of removable media drives may be integrated with base 212 without departing from the present invention. As can be appreciated, by allowing top access to removable media drive 208, other mechanisms commonly used to access removable media drives may be eliminated. Further use of integrated access cover 204 may allow access to other internal devices 210 which may include, for example, a hard drive, a memory card, a memory port, a processor, a network card, or a graphics card.

In the embodiment illustrated, integrated access cover 204 is configured to translate along a y-translation path 216. In the illustration, integrated access cover 204 is configured to translate from left (closed position) to right (open position). However, as can be appreciated, embodiments may be equally configured to translate from right (closed position) to left (open position) in accordance with user configuration preferences. In some embodiments, integrated access cover 204 may also be configured to additionally translate integrated access cover along a z-translation path 218. It may be advantageous, in some embodiments, to additionally translate integrated access cover 204 in a z-direction in order to accommodate clearance requirements resulting in a y/z-translation path. Furthermore, using a close-stop mechanism (not shown) for securing the integrated access cover in a closed position and an open-stop mechanism (not shown) for securing the integrated access cover 204 in an open position may, in some embodiments, necessitate movement in the z-direction. In some embodiments, integrated access cover 204 may be operated manually while in other embodiments, integrated access cover 204 may be operated by a drive mechanism. Drive mechanisms will be discussed in further detail below for FIG. 4.

Figure 3:
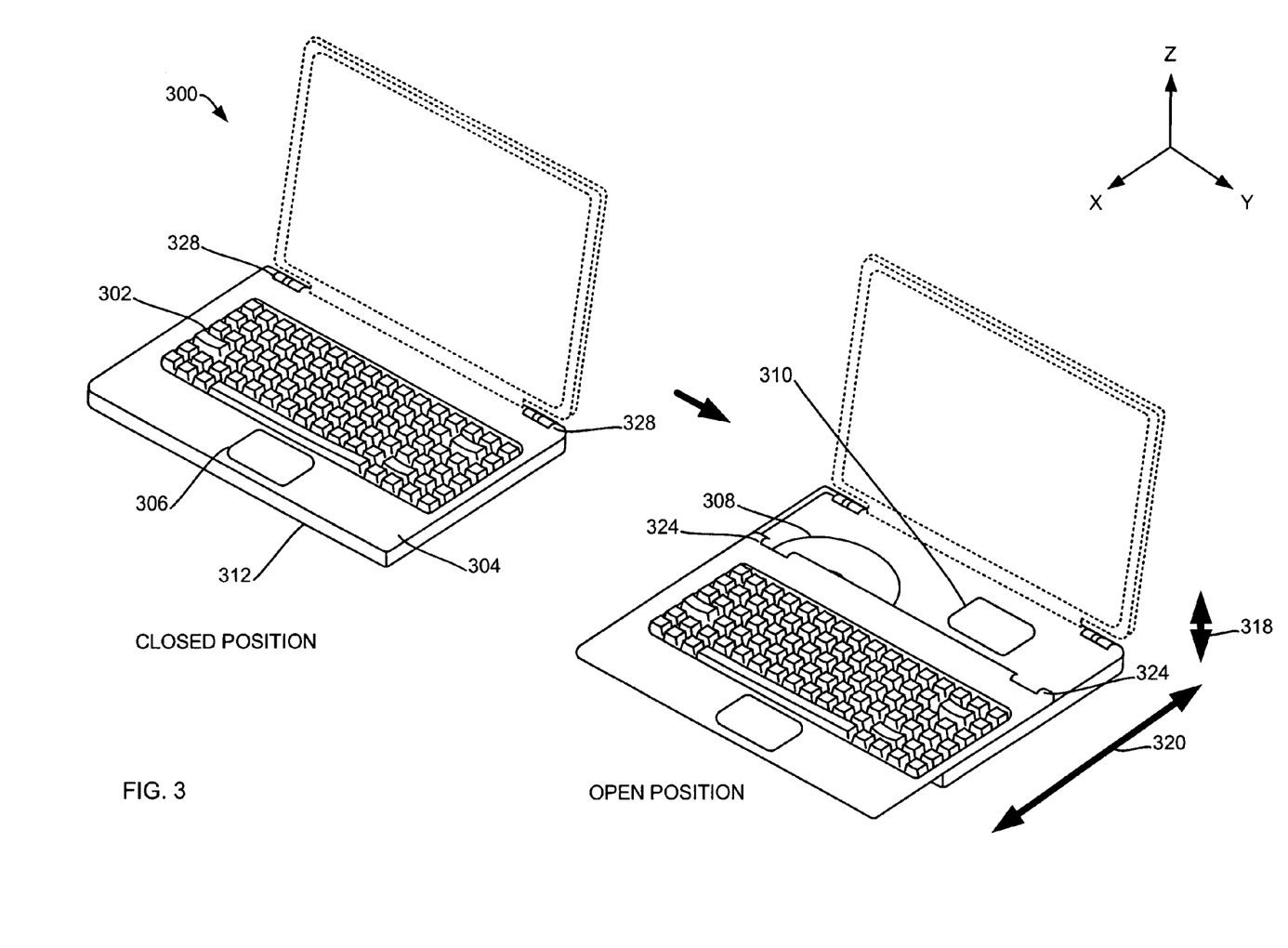
FIG. 3 is an illustrative representation of an embodiment of the present invention.

FIG. 3 is an illustrative representation of an embodiment of the present invention. In particular, a portable computing device 300 is illustrated having an integrated access cover 304 and a base 312. When integrated access cover 304 is in a closed position, portable computing device may be utilized normally. Thus keyboard 302 and track pad 306 may be utilized as integrated I/O devices. As noted above, any number of integrated I/O devices may be utilized without departing from the present invention. For example, a track ball, a click-selection button, volume controls, or any number of other devices may be utilized in accordance with user configuration preferences. As can be appreciated, a flexible flat cable (not shown) may be utilized to electronically connect integrated I/O devices with a processor. Further, in the illustrated embodiment, the device is configured with no transition line such as transition line 220 (FIG. 2). In some embodiments, a transition line may be undesirable aesthetically in accordance with user preferences. Thus, in some embodiments, integrated access cover 304 may be configured with notches 324 which provide clearance from hinges 328 or from any other non-movable component.

When integrated access cover 304 is translated to an open position, a removable media drive 308 may be exposed for user access. As noted above, any number of removable media drives may be integrated with base 312 without departing from the present invention. As can be appreciated, by allowing top access to removable media drive 308, other mechanisms commonly used to access removable media drives may be eliminated. Further use of integrated access cover 304 may allow access to other internal devices 310 which may include, for example, a hard drive, a memory card, a memory port, a processor, a network card, or a graphics card.

In the embodiment illustrated, integrated access cover 304 is configured to translate along a x-translation path 320. In the illustration, integrated access cover 304 is configured to translate from back (closed position) to forward (open position). In some embodiments, integrated access cover 304 may also be configured to additionally translate integrated access cover along a z-translation path 318. It may be advantageous, in some embodiments, to additionally translate integrated access cover 304 in the z-direction in order to accommodate clearance requirements resulting in an x/z-translation path. Furthermore, using a close-stop mechanism (not shown) for securing the integrated access cover in a closed position and an open-stop mechanism (not shown) for securing the integrated access cover 304 in an open position may, in some embodiments, necessitate movement in the z-direction. In some embodiments, integrated access cover 304 may be operated manually while in other embodiments, integrated access cover 304 may be operated by a drive mechanism. Drive mechanisms will be discussed in further detail below for FIG. 4.

Figure 4:
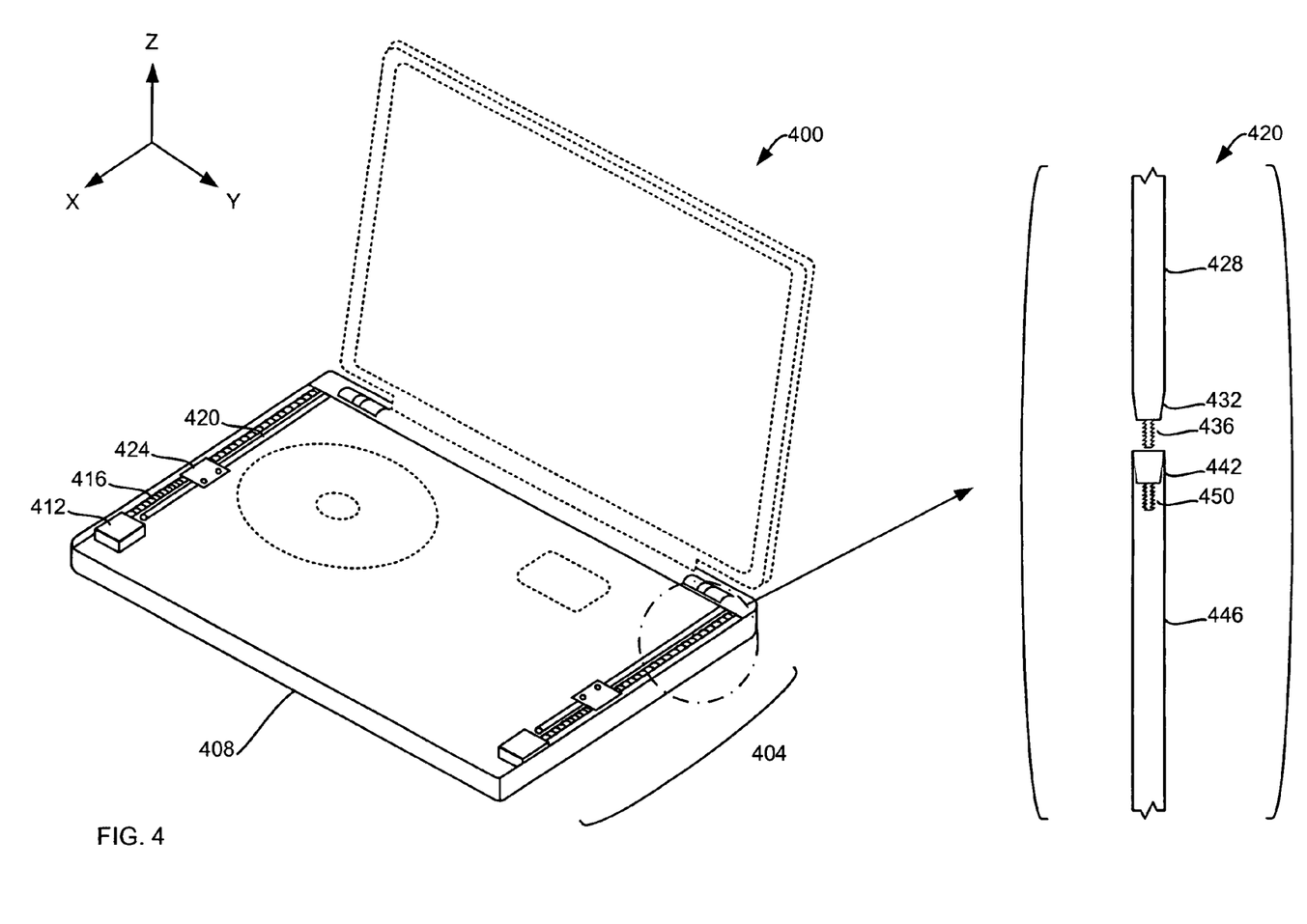
FIG. 4 is an illustrative representation of a drive mechanism in an embodiment of the present invention.

FIG. 4 is an illustrative representation of a drive mechanism in an embodiment of the present invention. In particular, a portable computing device 400 is illustrated having a drive mechanism 404. As illustrated, drive mechanism 404 is configured to translate an integrated access cover (not shown here) over x-translation path 320 (see FIG. 3). However, as can be appreciated, drive mechanism embodiments may be equally configured to translate an integrated access cover (not shown here) over y-translation path 216 (see FIG. 2). Drive mechanism 404 may be configured with a motor 412 for imparting a circular force. As can be appreciated, any number of motors may be utilized without departing from the present invention including, for example, a direct drive motor; a constant velocity motor; a stepper motor; a servo motor; a brushless DC motor; a brushed DC servo motor; a brushless AC servo motor; and a linear motor. Motor 412 may be selected in accordance with selected dimensional and power constraints. Motor 412 may be used to rotate drive screw 416.

Drive screw 416 provides linear translation of circular force provided by motor 412. A guide rail 420 may be configured to limit linear translation to a specific translation path. In this instance, an x-translation path is illustrated. Guide rail 420 is illustrated having a circular cross-sectional profile, but may be configured in any number of cross-sectional profiles as is well-known in the art. Guide rail 420 may be mechanically attached with base 408 in any manner well-known in the art. Translation bearing 424 traverses along the translation path by forces imparted by motor 412 as translated by drive screw 416. Translation bearing 424 is further configured in sliding mechanical communication with guide rail 420. In some embodiments, translation bearing 424 is self-centering. Translation bearing 424 provides an attachment point for integrated access cover 304 (see FIG. 3).

As can be appreciated, in some embodiments, rapid assembly may be required in high volume production environments. As such, guide rail 420 may be further configured to accommodate rapid assembly. Guide rail 420 may include at least two portions: a first section 428, and a second section 446. First section 428 may be configured to allow translation bearing 424 to escape drive mechanism 404. In assembly, removal of first section 428 allows integrated access cover with translation bearing 424 to be preassembled. Once integrated access cover is in place, first section 428 may be removably attached with second section 446. In some embodiments, first and second sections may be configured with a self-centering bevel 432 and a mating bevel 442 which direct threaded end 436 to threads 450. In this manner, assembly may be more efficiently accomplished. As can be appreciated, any number of self-centering configurations may be utilized including for example: guide pin configurations and sleeve configurations. Further, although as illustrated, first section is tapered, second section may also be tapered in some embodiments.

Figure 5A:
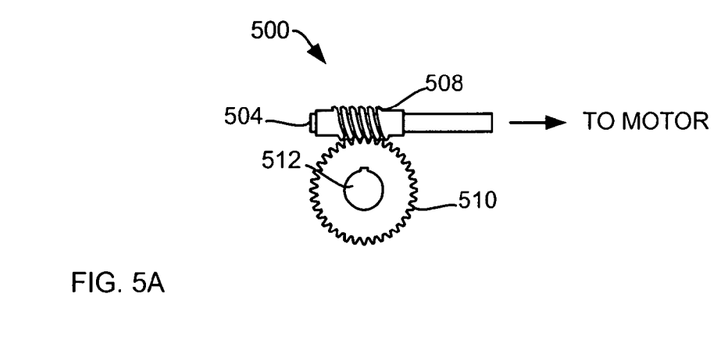
FIG. 5A is an illustrative representation of a worm gear assembly in an embodiment of the present invention.

FIG. 5A is an illustrative representation of a worm gear assembly 500 in an embodiment of the present invention. In some embodiments, motor selection may be limited due to size and power requirements. Thus, in some embodiments a worm gear assembly 500 may be utilized where a low speed direct drive motor is undesirable. Worm gear assemblies are generally well-known in art. Drive axle 504 may be configured having flutes 508. Flutes 508 mate with gear 510 forcing gear 510 to rotate. A drive screw may be mated with keyed axle hole 512. Worm drive assemblies may be used in configurations where a high speed motor is preferred. Worm drive assemblies effectively reduce the rotations per unit of time of a high speed motor. Further worm drive assembly 500 may provide an effective locking function on a drive screw because the drive screw cannot rotate independently when flutes 508 are in mechanical communication with gear 510. As such, a separate locking mechanism may not be required. It may be appreciated that an integrated access cover utilized in embodiments as shown herein requires added stability when in the closed position so that integrated I/O functions may be effectively accomplished. A worm drive assembly may provide such an advantage.

Figure 5B:
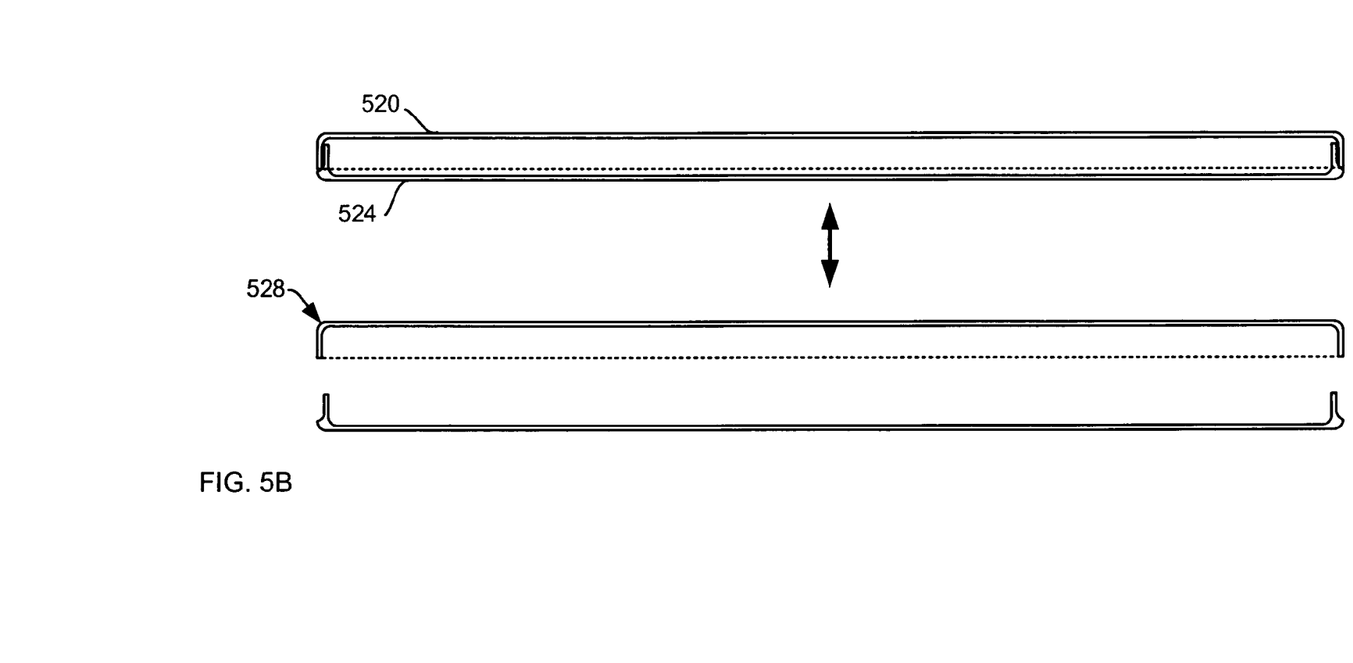
FIG. 5B is a cross-sectional illustration in an embodiment of the present invention.

FIG. 5B is a cross-sectional illustration in an embodiment of the present invention. As can be appreciated, in some embodiments, an integrated access cover may include further structural considerations. As shown, integrated access cover 520 may overlap base 524. One advantage of this embodiment is that curved portion 528 may add rigidity to integrated access cover 520. Furthermore, a nested configuration may reduce or simplify guide rail considerations because guiding function is accomplished by the cover's structural configuration. Still further, a nested configuration may also reduce dust and contaminate incursions into the base 524. As can be appreciated, aesthetic advantages may also derive from a nested configuration in the reduction of transition lines and the like.

Figure 6:
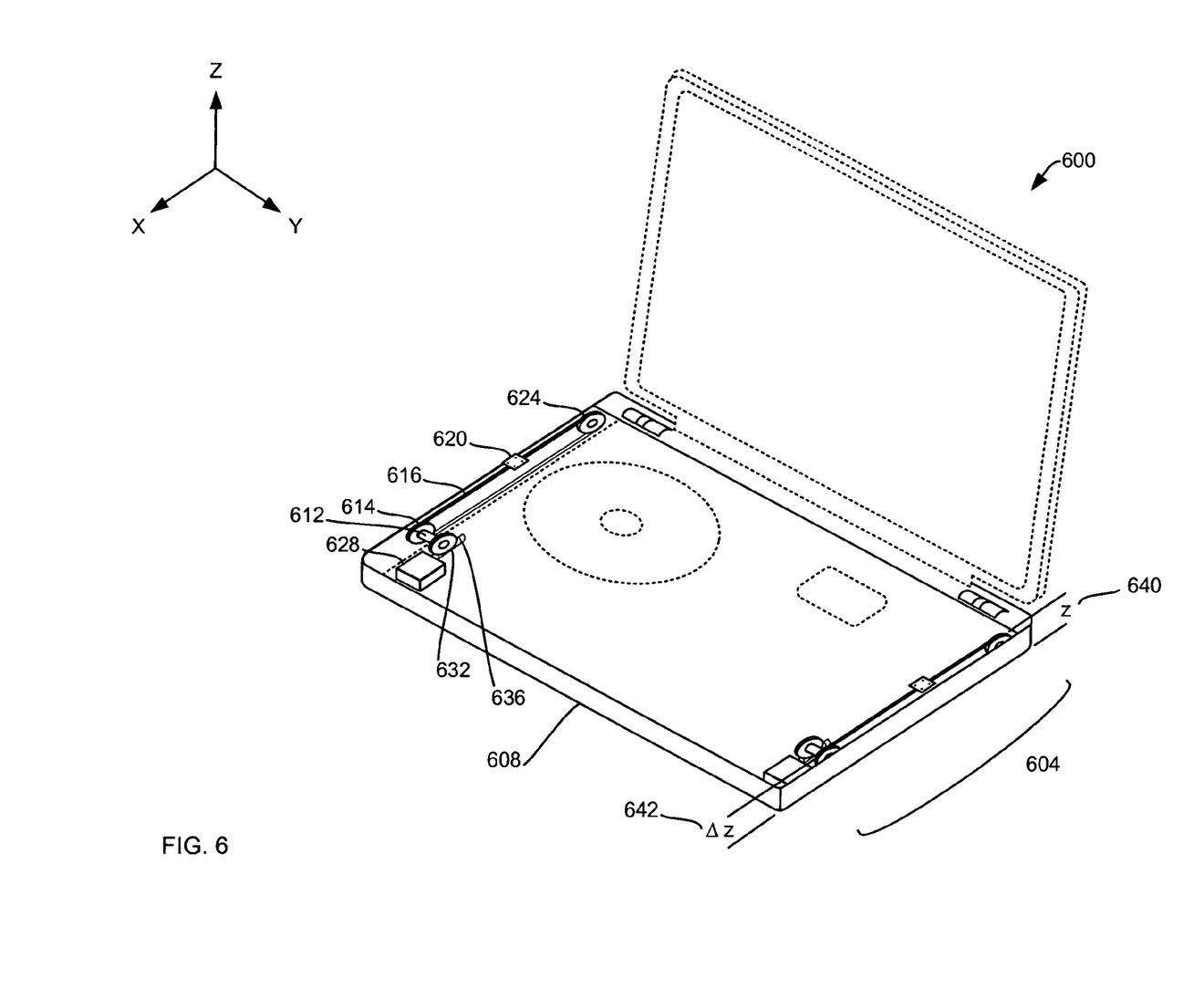
FIG. 6 is an illustrative representation of a belt driven assembly in an embodiment of the present invention.

FIG. 6 is an illustrative representation of a belt driven assembly in an embodiment of the present invention. In particular, a portable computing device 600 is illustrated having a drive mechanism 604 housed in base 608. As illustrated, drive mechanism 604 is configured to translate an integrated access cover (not shown here) over x-translation path 320 (see FIG. 3). However, as can be appreciated, drive mechanism embodiments may be equally configured to translate an integrated access cover (not shown here) over y-translation path 216 (see FIG. 2). Furthermore, drive mechanism 604 may be configured to translate an integrated access cover (not shown) over a z-translation path from an initial z-dimension 640 to a Δ z-dimension 642. One advantage of translating an integrated access cover over a z-translation path is that dimensional impingement may be avoided. Additionally, z-translation may provide a ready positive close stop that allows for a more secure and stable close position.

Drive mechanism 604 may be configured with a motor 628 for imparting a force. As can be appreciated, any number of motors may be utilized without departing from the present invention including, for example, a direct drive motor; a constant velocity motor; a stepper motor; a servo motor; a brushless DC motor; a brushed DC servo motor; a brushless AC servo motor; and a linear motor. Motor 628 may be selected in accordance with selected dimensional and power constraints. Motor 628 may be used to rotate gear 632 via drive screw 636. As can be appreciated, motors may be employed directly (i.e. direct drive) or may be utilized in combination with a reduction unit such as a worm drive assembly.

As noted above, worm drive assemblies may be used in configurations where a high speed motor is preferred or required. Worm drive assemblies effectively reduce the rotations per unit of time of a high speed motor. Further a worm drive assembly may provide an effective locking function on a drive screw because the drive screw cannot rotate independently when flutes are in mechanical communication with gear 632. As such, a separate locking mechanism may not be required. It may be appreciated that an integrated access cover utilized in embodiments as shown herein requires added stability when in the closed position so that integrated I/O functions may be effectively accomplished. A worm drive assembly may provide such an advantage.

As illustrated gear 632 may impart rotational force to mechanically coupled drive pin 612. Drive pin 612 is, in turn, mechanically coupled with drive roller 614. Drive roller 614 may be configured to receive drive belt 616. In some embodiments, drive belt 616 is configured with a toothed inner surface. As can be appreciated a toothed inner surface provides positive traction for a belt with a mating surface such as drive roller 614 and guide roller 624. In other embodiments, drive belt 616 is configured with a textured surface. In still other embodiments, drive belt 616 is configured with a substantially smooth surface. As can be appreciated, drive belt 616 provides linear translation of circular force provided by motor 628.

Attachment plate 620 provides an attachment point for belt 616 with an integrated access cover (not shown). Attachment plate 620 may be coupled with belt 616 in any manner well known in the art including, for example, gluing, bonding, clamping, or screwing. Coupling techniques must be selected such that an acceptable duty cycle may be achieved. Further, as can be appreciated, use of an attachment plate in cooperation with a belt may, in some embodiments, eliminate guide rails or centering plates as a belt may allow an integrated access cover sufficient lateral movement to avoid jamming. Integrated access cover may be attached with screws or bolts accessible under, for example, a removable key or plate.

In addition, as can be appreciated, example embodiment illustrated in FIG. 6 may also be configured with a guide rail such as guide rail 420 as illustrated in FIG. 4. Thus, as noted above, guide rail (see FIG. 4) may be configured to limit linear translation to a specific translation path. Furthermore, as noted above, in some embodiments, rapid assembly may be required in high volume production environments. As such, guide rail may be further configured to accommodate rapid assembly.

While this invention has been described in terms of several embodiments, there are alterations, permutations, and equivalents, which fall within the scope of this invention. It should also be noted that there are many alternative ways of implementing the methods and apparatuses of the present invention. For example, in the embodiments illustrated, dual motors are shown. However, it is equally feasible to utilize a single motor to provide circular forces. It is therefore intended that the following appended claims be interpreted as including all such alterations, permutations, and equivalents as fall within the true spirit and scope of the present invention.

What is claimed is:

1. An arrangement for use in a computing device, the computing device configured to be used by at least a user, the computing device including at least a processor and a display, the arrangement comprising:
 a base configured to house at least an internal device of the computing device, the base being attached to the display by way of a hinge assembly, the display configured to rotate about a first axis with respect to the base at the hinge assembly;
 an integrated access cover coupled with the base, the integrated access cover having a notched portion aligned with and sized to accommodate the hinge assembly;
 a drive mechanism that causes the integrated access cover to be linearly translated with respect to both the display and the base between at least a closed position and an open position along at least a second axis; and
 a guide rail that in cooperation with the drive mechanism limits the linear translation of the integrated access cover to a translation path along the second axis, wherein the second axis is perpendicular to the first axis, wherein in the closed position, the drive mechanism causes the notched portion to fully engage with the hinge assembly acting as a close stop mechanism, and wherein in the open position the drive mechanism acts to stop the linear translation of the integrated access cover as an open stop mechanism.

2. The arrangement of claim 1 wherein
 the computing device comprises:
 a touch pad; and
 a keyboard, wherein the keyboard is closer to both the hinge assembly and the display when the integrated access cover is in the closed position than when the integrated access cover is in the open position.

3. The arrangement of claim 1 wherein the integrated access cover further includes at least volume controls.

4. The arrangement of claim 1 wherein the close-stop mechanism secures the integrated access cover in the closed position and
 the open-stop mechanism secures the integrated access cover in the open position.

5. The arrangement of claim 1 wherein the drive mechanism includes at least
 a motor for imparting a circular force, the motor having a first rotation speed,
 a drive screw, in mechanical communication with the motor, for imparting a linear translation force, and
 a translation bearing attached with the integrated access cover and slidingly connected with the guide rail.

6. The arrangement of claim 5 wherein the motor is selected from a group consisting of: a direct drive motor; a constant velocity motor; a stepper motor; a servo motor; a brushless DC motor; a brushed DC servo motor; a brushless AC servo motor; and a linear motor.

7. The arrangement of claim 5 wherein the drive mechanism further comprises a worm drive assembly for reducing the first rotation speed.

8. The arrangement of claim 1 wherein the guide rail includes at least a first section and a second section, the first section including at least a threaded end, the second section including at least a set of threads disposed inside the second section, the threaded end being configured to be disposed inside the second section such that the first section and the second section are coupled by the threaded end and the set of threads.

9. The arrangement of claim 8 further comprising a translation bearing configured to couple the integrated access cover with the guide rail, the translation bearing configured to be in sliding mechanical communication with the guide rail.

10. The arrangement of claim 1 wherein the integrated access cover is further configured to be translated with respect to the base along at least a third axis without rotating with respect to the base.

11. The arrangement of claim 1 further comprising a drive mechanism, wherein the drive mechanism includes at least:
 a motor for imparting a circular force, the motor having a second rotation speed,
 a worm drive assembly for reducing the second rotation speed,
 a belt assembly for converting the circular force to the linear translation force such that the integrated access cover is moved over a translation path, and
 an attachment plate for mechanically coupling the integrated access cover with the belt assembly.

12. The arrangement of claim 1 wherein the integrated access cover further includes at least a curved portion for adding rigidity to the integrated access cover, the curved portion configured to guide linear translation of the integrated access cover.

13. The arrangement of claim 1 wherein the integrated access cover further includes at least a curved portion for adding rigidity to the integrated access cover, the curved portion nesting with the base.

14. A method, comprising:
providing a computing device configured to be used by at least a user, the computing device comprising:
a display,
a base configured to house at least an internal device of the computing device, the base being attached to the display by way of a hinge assembly, the display configured to rotate about a first axis with respect to the base at the hinge assembly,
an integrated access cover coupled with the base, the integrated access cover having a notched portion aligned with and sized to accommodate the hinge assembly;
a drive mechanism, and
a guide rail;
opening the integrated access cover by activating the drive mechanism, the activated drive mechanism causing the integrated access cover to linearly translate in a first direction along a translation path in accordance with a second axis using the guide rail, wherein the second axis is perpendicular to the first axis, wherein the drive mechanism acts as an open stop mechanism to stop the linear translation; and
closing the integrated access cover by activating the drive mechanism, the activated drive mechanism causing the integrated access cover to linearly translate in a second direction opposite to the first direction along the translation path in accordance with the second axis using the guide rail, wherein when the notched portion fully engages with the hinge assembly, the hinge assembly stops the linear translation as a close stop mechanism.

15. The method of claim 14 wherein the integrated access cover includes a keyboard that is closer to both the hinge and the display when the integrated access cover is in the closed position than when the integrated access cover is in the open position.

16. The method of claim 14 wherein the integrated access cover further includes at least volume controls.

17. The method of claim 14 wherein the drive mechanism includes at least
a motor for imparting a circular force, the motor having a first rotation speed,
a drive screw, in mechanical communication with the motor, for imparting a linear translation force, and
a translation bearing attached with the integrated access cover and slidingly connected with the guide rail.

18. The method of claim 14 wherein the integrated access cover is further configured to be translated with respect to the base along at least a third axis without rotating in respect to the base.

19. The method of claim 14 wherein the guide rail includes at least a first section and a second section, the first section including at least a threaded end, the second section including at least a set of threads disposed inside the second section, the threaded end being configured to be disposed inside the second section such that the first section and the second section are coupled by the threaded end and the set of threads.

* * * * *